Patented May 5, 1925.

1,536,708

UNITED STATES PATENT OFFICE.

HERBERT GORKE, OF LEVERKUSEN, NEAR COLOGNE, GERMANY, ASSIGNOR TO FARBENFABRIKEN VORM. FRIEDR. BAYER AND CO., OF LEVERKUSEN, NEAR COLOGNE, GERMANY.

PROCESS FOR PRODUCING SULPHURYL CHLORIDE.

No Drawing.    Application filed October 17, 1924.   Serial No. 744,256.

*To all whom it may concern:*

Be it known that I, HERBERT GORKE, citizen of Germany, residing at Leverkusen, near Cologne, in the State of Prussia, Germany, have invented new and useful Improvements in Processes for Producing Sulphuryl Chloride, of which the following is a specification.

It has been found that sulphuryl chloride $SO_2Cl_2$ can be obtained with a good yield and directly in a pure state by treating chlorine with sulphur dioxid ($SO_2$) in the presence of graphite.

A glass tube which can be externally cooled with water is filled with 100 cubic centimetres of graphite and 20 litres of chlorine and 21 litres of sulphur dioxid are led through it during one hour. 110 grams of sulphuryl chloride are thus obtained per one hour.

I claim:

The process for producing sulphuryl chloride, which process consists in treating chlorine with sulphur dioxid in the presence of graphite.

In testimony whereof I have hereunto set my hand.

HERBERT GORKE.